United States Patent
Ito et al.

(10) Patent No.: US 11,241,786 B2
(45) Date of Patent: Feb. 8, 2022

(54) SERVO CONTROL DEVICE, ROBOT, AND SERVO CONTROL METHOD

(71) Applicant: NIDEC SANKYO CORPORATION, Nagano (JP)

(72) Inventors: Akihiro Ito, Nagano (JP); Shunya Yazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 307 days.

(21) Appl. No.: 16/582,044

(22) Filed: Sep. 25, 2019

(65) Prior Publication Data
US 2020/0101596 A1 Apr. 2, 2020

(30) Foreign Application Priority Data
Sep. 27, 2018 (JP) .............................. JP2018-182061

(51) Int. Cl.
*B25J 9/10* (2006.01)
*H02P 23/18* (2016.01)
*F16H 49/00* (2006.01)

(52) U.S. Cl.
CPC .......... *B25J 9/1025* (2013.01); *F16H 49/001* (2013.01); *H02P 23/186* (2016.02)

(58) Field of Classification Search
CPC .. H02P 5/60; H02P 27/00; H02P 27/04; H02P 27/06; H02P 2203/05; H02P 29/028; H02P 1/00; H02P 1/16; H02P 1/163; H02P 1/18; H02P 1/24; H02P 1/26; H02P 1/42; H02P 1/46; H02P 1/465; H02P 6/00; H02P 5/56; H02P 5/695; H02P 5/747; H02P 5/753; H02P 6/16; H02P 6/32; H02P 6/26; H02P 21/00; H02P 21/18; H02P 23/00; H02P 23/0004; H02P 23/07; H02P 23/18; H02P 23/186; H02P 6/007; G05B 2219/49292; G05B 19/404; G05B 19/231; G05B 19/251; G05B 19/291; G05B 19/311; G05B 19/351; G05B 19/371;
(Continued)

(56) References Cited

U.S. PATENT DOCUMENTS 6,664,752 B2 * 12/2003 Kanayama ........... G05B 19/311
318/560
9,075,399 B2 * 7/2015 Yamamoto .............. H02P 23/00
(Continued)

FOREIGN PATENT DOCUMENTS

| JP | 2002175120 A | 6/2002 |
| JP | 2008090692 A | 4/2008 |

*Primary Examiner* — Antony M Paul
(74) *Attorney, Agent, or Firm* — Cantor Colburn LLP

(57) ABSTRACT

A servo control device for controlling a motor based on a position command when an operation target is connected to the motor via a wave gear reduction mechanism may include a position control system configured to detect a shaft angular position of the motor to perform a closed-loop control based on the shaft angular position; an inverse control element having an inverse characteristic of dynamics of the position control system; and a compensation amount generation unit configured to generate a compensation amount for compensating for an angular transmission error of the wave gear reduction mechanism. The inverse control element is configured to apply compensation amount to the position control system.

20 Claims, 5 Drawing Sheets

(58) Field of Classification Search
CPC . G05B 2219/33218; G05B 2219/45083; B25J 9/1633; Y10S 901/08
See application file for complete search history.

(56) References Cited

U.S. PATENT DOCUMENTS

2011/0054820 A1\* 3/2011 Sasaki ................ H02P 23/14
702/94
2012/0271459 A1\* 10/2012 Okitsu ................ G05B 13/041
700/275

\* cited by examiner

SERVO CONTROL DEVICE, ROBOT, AND SERVO CONTROL METHOD

CROSS REFERENCE TO RELATED APPLICATION

The present application claims priority under 35 U.S.C. § 119 to Japanese Application No. 2018-182061 filed Sep. 27, 2018, the entire content of which is incorporated herein by reference.

FIELD

At least an embodiment of the present invention relates to a servo control device for performing a position control and a shaft control on a control target connected via a wave gear device to a motor, and relates also to a servo control method.

BACKGROUND

A wave gear device configured by combining an annular internal gear having internal teeth on an inner peripheral side, a flexible annular external gear arranged radially inward of the internal gear, the external gear including external teeth meshing with the internal teeth of the internal gear on an outer periphery thereof, and an elliptical cam arranged radially inward of the external gear, the cam being configured to radially deform the external gear by being rotated, is characterized in that the wave gear device can provide a large reduction ratio, the wave gear device provides input and output on the same shaft, the size of the wave gear device is small, and the like, and is widely used as a reduction gear in a drive shaft of an industrial robot, for example. A reduction gear using a wave gear device is called a wave gear reduction mechanism. It is known that the wave gear device has an angular transmission error (also referred to as a rotation transmission error) unique to the wave gear device caused due to a processing error of teeth in each spline, or the like (see Non-Patent Literature 1, for example (Takeshi Ishida, et al., "Rotational Transmission Errors of Strain Wave Gearing (Experimental Study)", Journal of the Japan Society of Mechanical Engineers, Series C, Vol. 61, No. 592 (1995), p. 202-210)). A prominent first-order frequency component of the angular transmission error is an error caused due to a rotational angular position of an output shaft periodically fluctuating around a reference position determined by a reduction ratio from a rotation angular position of an input shaft. Since this error is a cyclically fluctuating error, for example, in a case of a robot provided with a wave gear reduction mechanism, the angular transmission error causes an arm to vibrate. In particular, when a robot arm is driven, if the first-order frequency component of the angular transmission error matches a mechanical resonance frequency of the arm, the arm will vibrate continuously.

Robot servo control usually employs semi-closed loop control in which a rotational position of a motor configured to drive each arm is detected, and a performance of a servo control system is enhanced to provide compensation to prevent vibration of the motor shaft due to disturbance or the like. However, it is difficult to remove an influence from disturbance having periodicity and being added at the rear of the motor shaft, such as disturbance generated by the wave gear reduction mechanism, simply by enhancing the performance of the servo control system, and thus, the robot arm may still continue to vibrate.

A method of compensating for an angular transmission error of the wave gear device is disclosed in Toshimasa Miyazaki, et al., "Robust Speed Control for Robot Arm Considering Angular Transmission Error of Gear", Journal D of the Institute of Electrical Engineers of Japan, Vol. 118, No. 12 (1998), p. 1427 to 1434 (hereinafter, referred to as Non-Patent Literature 2). The method in which a two-inertia system model is introduced and an observer is used for the compensation, however, in this method, a controller becomes highly complicated. Makoto Iwasaki, et al., "Suppression of Resonant Vibration due to Angular Transmission Errors of Harmonic Drive Gearings by Variable Notch Filter", Journal of the Japan Society for Precision Engineering, Vol. 78, No. 10 (2012), p. 887-893 (hereinafter, referred to as Non-Patent Literature 3) discloses a method of suppressing vibration due to an angle transmission error by inserting a notch filter in a closed loop and compensating for torque applied to the closed loop as disturbance. Since the frequency of each component of the angular transmission error is proportional to the number of rotations of the input shaft, in this method, it is necessary to make the cycle of the notch filter variable, however, if the cycle of the notch filter is variable, then the device becomes too complicated, but a great effect cannot be expected.

Japanese Unexamined Patent Application Publication No. 2002-175120 (hereinafter, referred to as Patent Literature 1) discloses a method of enhancing a positioning accuracy of an output shaft of an actuator provided with a motor and a wave gear reduction mechanism connected to the motor. In the method, when control is performed by feeding back position data of a rotating shaft of the motor, compensation about the angular transmission error is performed for a feedback amount of the position with reference to a correction table obtained by previously measuring and accumulating the relationship between the position of the rotating shaft of the motor and the angular transmission error. Japanese Unexamined Patent Application Publication No. 2008-90692 (hereinafter, Patent Literature 2) discloses that, in the method described in Patent Literature 1, the compensation is performed also for the feedback amount of a speed with reference to the correction table.

As the methods of performing the servo control by compensating for the angular transmission error of the wave gear device, the methods described in Non-Patent Literatures 2 and 3 have a problem in that a scale of the device is increased, or the effect is limited for the scale of the device. The methods in Patent Literatures 1 and 2 of performing correction for the feedback amount of the position, based on the rotational position of the motor also have limited effects due to an influence of dynamics of the system.

SUMMARY

At least an embodiment of the present invention provides a servo control device capable of effectively compensating for an angular transmission error of a wave gear device by semi-closed loop control without increasing a scale of a device, and to provide a servo control method.

A servo control device according to at least an embodiment of the present invention for controlling a motor based on a position command when an operation target is connected via a wave gear reduction mechanism to the motor, includes a position control system configured to detect a shaft angular position of the motor to perform a closed-loop control based on the shaft angular position, an inverse control element having an inverse characteristic of dynamics of the position control system, and a compensation amount generation unit configured to generate a compensation amount for compensating for an angular transmission error of the wave gear reduction mechanism. In the servo control device, the compensation amount is applied to the position control system via the inverse control element.

In the servo control device according to at least an embodiment of the present invention, the inverse control element having an inverse characteristic of dynamics of the position control system, and the compensation amount generation unit configured to generate a compensation amount for compensating for an angular transmission error of the wave gear reduction mechanism are provided. When the compensation amount of the angular transmission error is applied via the inverse control element to the position control system, as is obvious from a description later, a transfer function from the shaft angular position of the motor to an output angular position of the wave gear reduction mechanism is 1/N, where N is a reduction ratio of the wave gear reduction mechanism, that is, the transfer function is described only with the reduction ratio N, and as a result, the angular transmission error of the wave gear reduction mechanism can be accurately compensated.

In the servo control device of at least an embodiment according to the present invention, a compensation loop for feeding the shaft angular position of the motor back to the position control system is further provided outside the position control system, and the compensation amount generation unit and the inverse control element can be provided in the compensation loop. When the compensation amount generation unit and the inverse control element are provided in the compensation loop, design of the servo control device is facilitated.

In the servo control device according to at least an embodiment of the present invention, the position control system is configured by a discrete time system, and a delay element is added to the inverse control element. When the position control system is configured by a discrete time system, a digital control by a microprocessor or the like is enabled, and when the delay element is added to the inverse control element, the inverse control element can be reliably represented by a feasible (proper) function. In particular, when the compensation loop is provided, a forward compensation unit configured to perform forward compensation can be provide on an input side of the inverse control element in the compensation loop to compensate the delay elements added to make the inverse control element feasible, and thus, to provide more accurate compensation. If the forward compensation is performed, when the shaft angular position at a time advanced by a delay time period of the added delay element described above is estimated based on a cyclic difference value of a signal of a current motor shaft angular position to input the estimated shaft angular position to the compensation amount generation unit, the output signal can easily obtain a compensation amount of the time advanced by the delay time period, and perform appropriate error correction in accordance with the current shaft angular position.

In the servo control device according to at least an embodiment of the present invention, a closed-loop control based on a model matching control is executed in the position control system. The model matching control can be used to construct the position control system and the corresponding inverse control element simultaneously and stably, to easily adjust a command responsiveness to a desired characteristic while maintaining robustness against mismatches and disturbances, and to adjust the command responsiveness and the robustness independently. An example of such a model matching control includes that based on robust pole assignment in which two poles in the closed-loop control are assigned to be robust against disturbances. According to the model matching control based on the robust pole assignment, the poles to be robust against disturbances can be assigned to adjust the command responsiveness and the disturbance robustness separately. An example of the closed-loop control other than that based on the model matching control that can be used in the position control system includes a control based on a model following control in which a model corresponding to a control target is constructed and a control is performed on a result obtained by inputting a command to the model so that an actual output of the control target follows. The model following control can be used to secure the robustness while a control system that can obtain a desired response is constructed.

In the servo control device according to at least an embodiment of the present invention, the closed-loop control can be performed by using a method other than methods using the model matching control and the model following control in the position control system. For example, in the position control system, the closed-loop control based on a P-PI control may be executed. If the P-PI control is used, when an inverse control element in which "entire control system=closed-loop control system" is grasped is used, the angular transmission error of the wave gear reduction mechanism can be compensated. Alternatively, in the position control system, the closed-loop control based on a disturbance observer compensation control may be executed. Also if the disturbance observer compensation control is used, when an inverse control element in which "entire control system=closed-loop control system" is grasped is used, the angular transmission error of the wave gear reduction mechanism can be compensated.

In the servo control device according to at least an embodiment of the present invention, the compensation amount generation unit includes a correction table obtained by previously actually measuring and accumulating the relationship between the shaft angular position of the motor and the angular transmission error, and generates the compensation amount based on the correction table. The use of the correction table makes it possible to compensate for the angular transmission error characteristic different depending on each wave gear reduction mechanism accurately and easily. Alternatively, the compensation amount generation unit may have a function of previously actually measuring the relationship between the shaft angular position of the motor and the angular transmission error and approximating the first-order frequency component of the angular transmission error with a sine function, and based on the obtained sine function, generate the compensation amount. If the sine function for approximating the angular transmission error is used, once the sine function is found, it is only needed to store a few parameters for identifying the sine function, so that a memory consumption can be reduced compared to a case of using the correction table.

A servo control method according to at least an embodiment of the present invention for controlling a motor based on a position command when an operation target is connected via a wave gear reduction mechanism to the motor, includes the steps of: detecting a shaft angular position of the motor, and executing a closed-loop control based on the shaft angular position in a position control system; generating a compensation amount for compensating for an angular transmission error of the wave gear reduction mechanism, effecting an inverse characteristic of dynamics of the position control system on the compensation amount; and applying the compensation amount on which the inverse characteristic is effected, to the position control system.

In the servo control method according to at least an embodiment of the present invention, when a compensation amount for compensating for an angular transfer error of the wave gear reduction mechanism is generated, and the compensation amount is applied to the position control system after effecting the inverse characteristic of the dynamics on the position control system, a transfer function from the shaft angular position of the motor to an output angular position of the wave gear reduction mechanism is described only with a reduction ratio of the wave gear reduction mechanism, and thus, the angular transmission error of the wave gear reduction mechanism can be accurately compensated.

In the servo control method according to at least an embodiment of the present invention, in the compensation loop, provided outside the position control system, for feeding the shaft angular position of the motor back to the position control system, the step of generating a compensation amount and the step of effecting an inverse characteristic can be executed. As a result of a configuration where the step of generating a compensation amount and the step of effecting an inverse characteristic are executed, a compensation performance is improved.

In the servo control method according to at least an embodiment of the present invention, the closed-loop control is executed in the discrete time system and the delay element can be added to the inverse characteristic. When the position control system is configured by the discrete time system, a digital control by a microprocessor or the like is enabled, and when the delay element is added to the inverse characteristic, the inverse characteristic can be reliably represented by a feasible (proper) function. In particular, if a compensation loop is provided, it is possible to execute a step of performing forward compensation before the step of effecting an inverse characteristic in the compensation loop. If the forward compensation before effecting the inverse characteristic is performed, the delay element can be canceled by the forward compensation, and more accurate compensation can be performed. If the forward compensation is performed, when a shaft angular position at a time advanced by a delay time period is estimated based on a cyclic difference value of a signal of a current shaft angular position, the error correction in accordance with the current shaft angular position can be performed with a simple procedure.

In the servo control method according to at least an embodiment of the present invention, the compensation amount is generated with reference to a correction table obtained by previously actually measuring and accumulating the relationship between the shaft angular position of the motor and the angular transmission error. The use of the correction table makes it possible to compensate for the angular transmission error characteristic different depending on each wave gear reduction mechanism accurately and easily. In particular, it is easy to add a function of compensating for the angular transmission error to the existing servo control device. Alternatively, the compensation amount may be generated by a sine function for approximating a first-order frequency component of the angular transmission error obtained by previously actually measuring the relationship between the shaft angular position of the motor and the angular transmission error. If the sine function for approximating the angular transmission error is used, once the sine function is found, it is only needed to store a few parameters for identifying the sine function, so that a memory consumption can be reduced compared to a case of using the correction table.

According to at least an embodiment of the present invention, it is possible to effectively compensate for the angular transmission error of the wave gear device by the semi-closed loop control without increasing the scale of the device.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
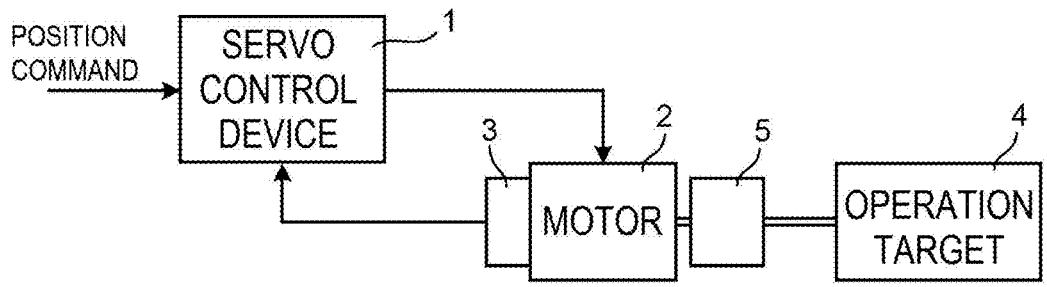
FIG. 1 is a block diagram illustrating a servo control system according to at least an embodiment of the present invention.

Next, at least an embodiment of the present invention will be described with reference to the drawings. FIG. 1 illustrates a configuration of a servo control system according to at least an embodiment of the present invention.

A servo control system according to the present embodiment includes a motor 2 configured to drive an operation target 4 and a servo control device 1 configured to control the motor 2. The operation target 4 is connected to the motor 2 via a wave gear reduction mechanism 5. The motor 2 is, for example, an AC servomotor or a DC servomotor, and drives the operation target 4 which is a load. The motor 2 is attached with a position detection mechanism 3 such as an encoder configured to detect a rotational position of the motor 2 independently of the wave gear reduction mechanism 5. The servo control device 1 executes a control based on a closed loop system, based on a position command applied from outside and a detection signal from the position detection mechanism 3 to drive the motor 2. It is noted that examples of the operation target 4 driven by the motor 2 include a robot hand and a robot arm included in a robot, and a moving mechanism for moving a position in a gravity direction of the robot hand.

Figure 2:
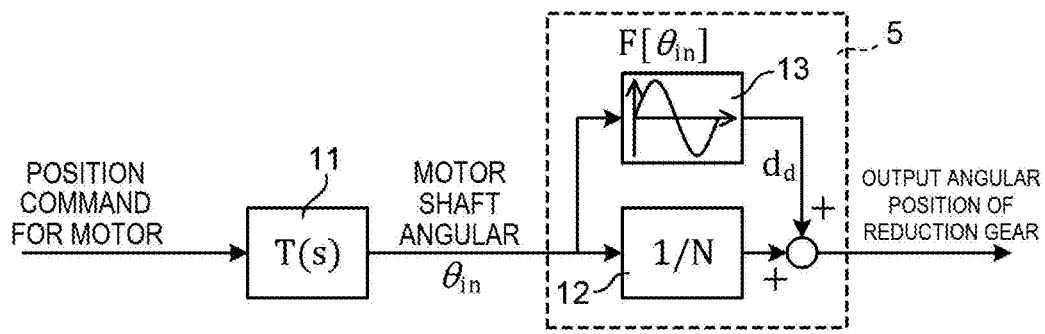
FIG. 2 is a block diagram illustrating a model of an angular transmission error of a system having a wave gear reduction mechanism.

FIG. 2 is a block diagram illustrating the servo control system illustrated in FIG. 1 and illustrates a model of an angular transmission error of the wave gear reduction mechanism 5. In FIG. 2, T(s) represents a transfer function of a position control system 11 including the servo control device 1, the motor 2, and the position detection mechanism 3, and configured to perform a closed-loop control, and receives a position command to the motor 2 to output an angular position of a shaft of the motor 2. The angular position of the shaft of the motor 2 is an input $\theta_{in}$ of the wave gear reduction mechanism 5. The wave gear reduction mechanism 5 is configured so that an angular transmission error element 13 configured to generate an angular transmission error represented by $F[\theta_{in}]$ is provided in parallel to an ideal reduction gear element 12 configured to reduce a speed of the input with a reduction ratio N, and outputs a result obtained by adding the angular transmission error to the output of the reduction gear element 12, as an output angular position. The angular transmission error can be treated as a cyclic disturbance on an output from the reduction gear element 12, and thus, the angular transmission error will be represented by $d_d$, as a disturbance.

Figure 3:
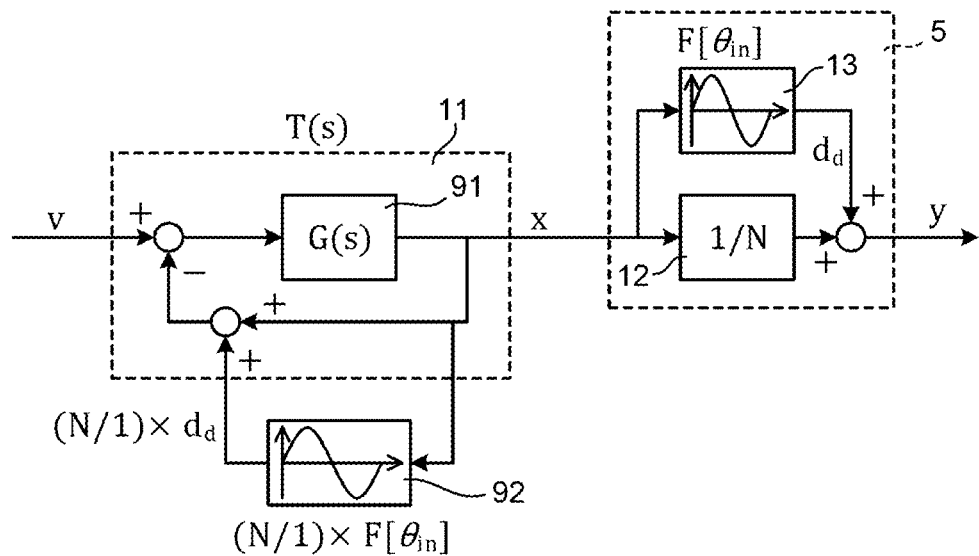
FIG. 3 is a block diagram illustrating a compensation method including correcting a feedback amount.

FIG. 3 is a block diagram illustrating a configuration where in a case that the position control system 11 configured to control the motor 2 by feeding back a rotational position x of the motor 2 detected by the position detection mechanism 3 is provided, when a compensation based on the angular transmission error is added to the feedback amount, as disclosed in Patent Literature 1, an influence of the angular transmission error in an output y of the wave gear reduction mechanism 5 is canceled. The position control system 11 also includes the motor 2. The position command for the motor 2 is represented by v, the transfer function of a loop gain element 91 including the motor 2 is represented by G(s), and an output position, that is, a shaft angular position x, of the motor 2 is input to the wave gear reduction mechanism 5. The shaft angular position x of the motor 2 is fed back in the position control system 11 and subtracted from a position command v, and the subtraction result is input to the loop gain element 91. A compensation amount generation unit 92 configured to generate the compensation amount for compensating for the angular transmission error corresponding to the shaft angular position x, is provided in parallel to a feedback path of the shaft angular position x, and a result obtained by adding the compensation amount to the shaft angular position x is fed back to the loop gain element 91. The compensation amount generation unit 92 generates a compensation amount obtained by multiplying the angular transmission error according to the shaft angular position x by a reduction ratio, that is, a compensation amount $(N/1) \times d_d$ obtained by multiplying the angular transmission error by (NA), regardless of whether based on a correction table obtained by previously actually measuring and accumulating the relationship between the shaft angular position x of the motor 2 and the angular transmission error $F[\theta_{in}]$, or based on an approximate function.

In the system illustrated in FIG. 3, an output angular position y of the wave gear reduction mechanism 5 is represented as:

$$y = (1/N) \times \{T(s)v - T(s) \times (N/1) \times d_d\} + d_d$$
$$= (1/N) \times x - (1/N) \times (N/1) \times T(s) \times d_d + d_d$$
$$= (1/N) \times x - T(s) \times d_d + d_d.$$

If (1−T(s)) is constantly 0, then y=(1/N)×x, but due to the dynamics of the system, it cannot be said that 1−T(s) is constantly 0. Therefore, in the system illustrated in FIG. 3, the influence of the angular transmission error remains in the output angular position of the wave gear reduction mechanism 5. The cause is that the compensation is performed on the feedback amount inside the position control system 11 represented by the transfer function T(s).

Figure 4:
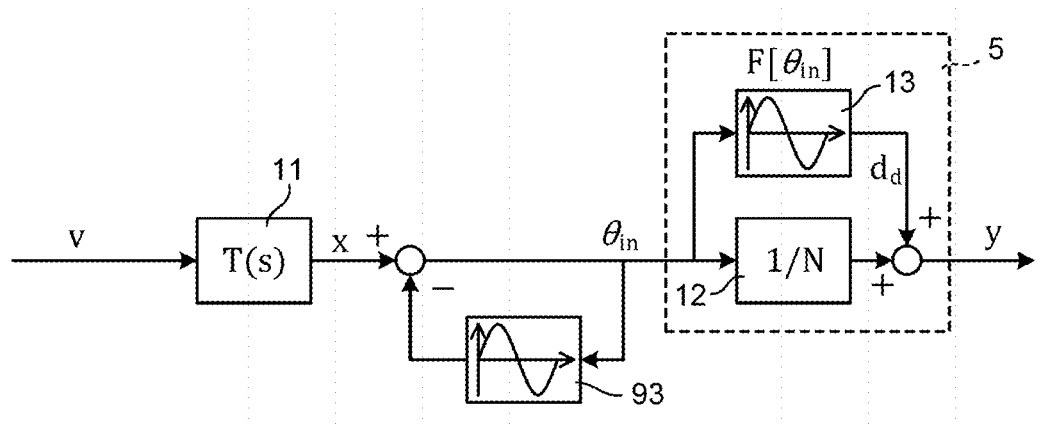
FIG. 4 is a block diagram of a system capable of compensating for an angular transmission error in principle.

FIG. 4 is a block diagram of a system capable of removing, in principle, the effect of the angular transmission error in the output of the wave gear reduction mechanism 5. In the system, the reduction ratio of the wave gear reduction mechanism 5 is N, a compensation amount generation element 93 configured to generate the compensation amount based on the input $\theta_{in}$ to the wave gear reduction mechanism 5 is provided, and a result obtained by subtracting the output of the position control system 11, that is, the compensation amount from the shaft angular position x of the motor 2, is input to the wave gear reduction mechanism 5. The compensation amount generation element 93 generates a compensation amount represented by $(N/1) \times F[\theta_{in}]$, that is, $(N/1) \times d_d$. In this system, the output angular position y of the wave gear reduction mechanism 5 is as follows:

$$y = (1/N) \times \{x - (N/1) \times d_d\} + d_d$$
$$= (1/N) \times x - (1/N) \times (N/1) \times d_d + d_d$$
$$= (1/N) \times x.$$

That is, in the output angular position y of the wave gear reduction mechanism 5, the influence of the angular transmission error $d_d$ does not appear.

Figure 5:
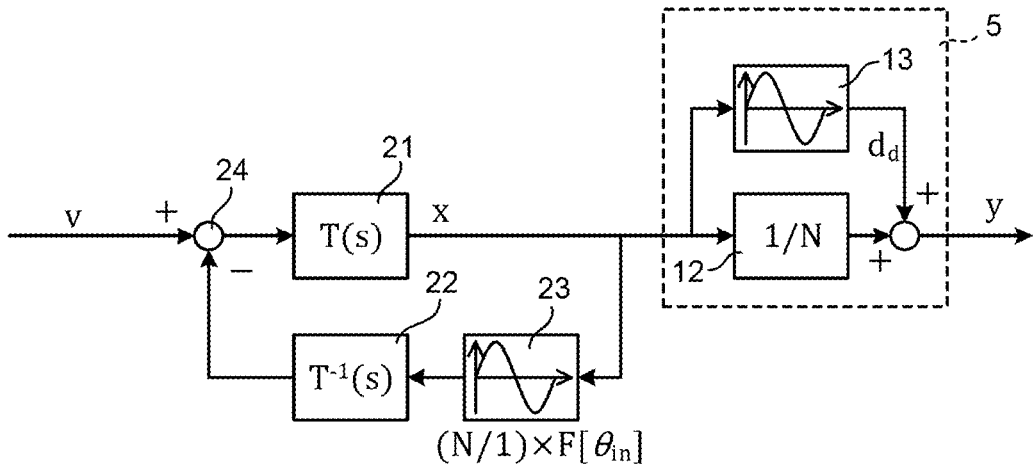
FIG. 5 is a block diagram for explaining a method of compensating for an angular transmission error in a servo control device according to at least an embodiment of the present invention.

However, the system illustrated in FIG. 4 attempts to mechanically compensate for a shaft angle, that is, the input of the wave gear reduction mechanism 5, and thus, the system cannot be practically realized. Therefore, in at least an embodiment of the present invention, a system for approximating the system illustrated in FIG. 4 is constructed to compensate for the angular transmission error in the servo control device 1. FIG. 5 is a block diagram for explaining a method of compensating for the angular transmission error in the servo control device according to at least an embodiment of the present invention. In FIG. 5, the transfer function of a position control system 21 configured to control the shaft angular position x of the motor 2 by the closed-loop control is represented by T(s). The position control system 21 also includes an output shaft of the motor 2, and therefore, the position detection mechanism 3 and the like illustrated in FIG. 1 are included in the position control system 21. In the system illustrated in FIG. 5, a feedback loop for the angular transmission error compensation, that is, the compensation loop, is provided outside the position control system 21, in the compensation loop, a compensation amount generation unit 23 is provided, and an inverse system 22 of the position control system 21 is generated, and the inverse system 22 and the compensation amount generation unit 23 are used to compensate for the angular transmission error. The shaft angular position x of the motor 2 is the input to the wave gear reduction mechanism 5 and is applied to the compensation amount generation unit 23 via the compensation loop. The compensation amount generation unit 23 is a model of the angular transmission error, and generates a compensation amount $(N/1) \times d_d$ obtained by multiplying the angular transmission error according to the shaft angular position x by the reduction ratio. The compensation amount generation unit 23 may be based on a correction table obtained by previously actually measuring and accumulating the relationship between the shaft angular position x of the motor 2 and the angular transmission error $F[\theta_{in}]$, or may be based on a function generator configured to generate a function of approximating the angular transmission error; however, the compensation amount generation unit 23 may use the correction table based on the actual measurement because the characteristic of the angular transmission error differs depending on each wave gear reduction mechanism 5. An example of the function of approximating the angular transmission error may include a trigonometric function such as a sine function. If the compensation amount is generated based on an approximate function, the relationship between the shaft angular position x of the motor 2 and the angular transmission error $F[\theta_{in}]$ is previously actually measured to evaluate the first-order frequency component of the angular transmission error $[\theta_{in}]$ to evaluate the sine function of approximating the first-order frequency component. Then, the compensation amount is generated based on the sine function. In this case, the compensation amount generation unit 23 has an approximation function of evaluating a sine function of approximating the actually measured data. The compensation amount $(N/1) \times d_d$ generated by the compensation amount generation unit 23 is input to the inverse system 22. The position command v for the motor 2 is input to the position control system 21 after the output of the inverse system 22 is subtracted in a subtractor 24.

In the system illustrated in FIG. 5, the output angular position y of the wave gear reduction mechanism 5 is represented as follows:

$$y = (1/N) \times \{T(s)v - T(s)T^{-1}(s) \times (N/1) \times d_d\} + d_d$$
$$= (1/N) \times x - (1/N) \times (N/1)T(s)T^{-1}(s) \times d_d + d_d$$
$$= (1/N) \times x - T(s)T^{-1}(s) \times d_d + d_d.$$
$$= (1/N) \times x.$$

That is, in the output of the wave gear reduction mechanism 5, the influence of the dynamics is removed, and the influence of the angular transmission error will not appear at each output angular position y of the wave gear reduction mechanism.

In the system illustrated in FIG. 5, a portion obtained by removing the motor 2 and the position detection mechanism 3 from the position control system 21, and the inverse system 22, the compensation amount generation unit 23, and the subtractor 24 are constructed in the servo control device 1 in the configuration illustrated in FIG. 1.

In many cases, the inverse system 22 is non-proper and cannot be realized as is. If the inverse system 22 is non-proper, an appropriate delay is added to a transfer function $T^{-1}(s)$ of the inverse system 22 so that the inverse system 22 is proper, and a phase advance process is performed on the input of the compensation amount generation unit 23 to compensate for the delay. The phase advance process or a phase advance compensation includes estimation of a future value, but the input of the compensation amount generation unit 23 is the shaft angular position x of the motor 2 and a time period change is small as compared to the compensation signal (error signal) which is the output of the compensation amount generation unit 23, and thus, the future value can be estimated with sufficient accuracy. Alternatively, if the change in the shaft angular position x of the motor 2 is sufficiently slow compared to a response speed of the position control system 21, the influence of the angular transmission error can be substantially removed simply by adding the delay to the transfer function $T^{-1}(s)$ of the inverse system 22 even if the phase advance process is not performed.

The method of performing the servo control based on the system illustrated in FIG. 5 is based on the premise that the position control system 21 for performing the closed-loop control does not fluctuate, and modeling can be correctly performed to a certain extent. More specifically, in this method, it is required to be able to construct the system T(s) and the inverse system $T^{-1}(s)$ simultaneously and stably, so that it is possible to construct the position control system 21 which is clearly modeled, that is, a model matching control system. Therefore, this method is difficult to be realized stably because it is difficult to obtain the inverse system in some classical control methods mainly based on a gain adjustment through trials and errors of each element included in the control system. However, this does not deny the use of the position control system 21 configured to perform the closed loop control by P (proportional)-PI (proportional integral) control, and the closed-loop control may be based on the P-PI control, but it means that the P-PI control is a modeled system. When the position control system 21 is the model matching control system, the position control system 21 is controlled to be matched to a clear model with less fluctuation to construct the inverse system to perform feedback compensation by using this feature. The delay occurs when the inverse system is constructed in this way, and thus, to compensate for the delay, the input signal to the compensation amount generation unit 23 (that is, the output x of the position control system 21) is subject to phase advance compensation. An example of a method of performing the phase advance compensation includes a method of estimating and compensating for an input signal by using its pseudo differential (difference).

Figure 6:
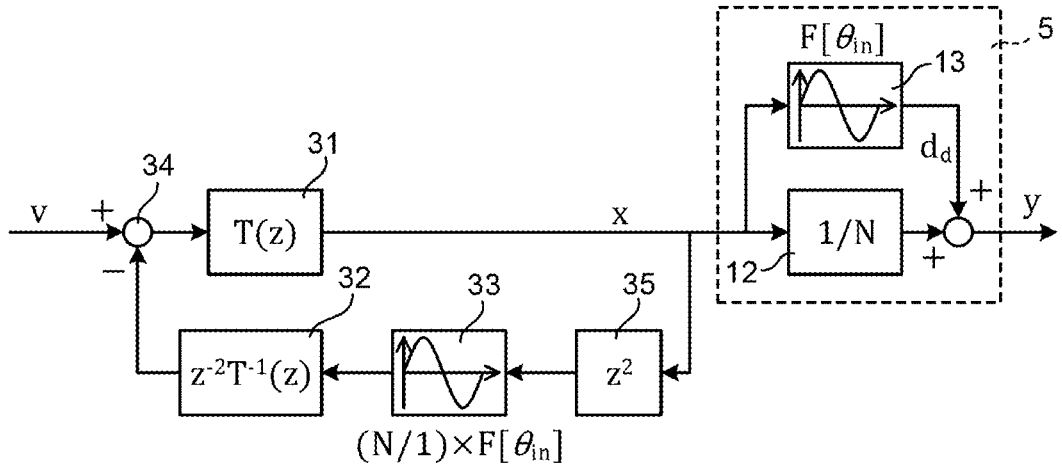
FIG. 6 is a block diagram illustrating an example in which the compensation method illustrated in FIG. 5 is discretized.

If the servo control device 1 includes a microprocessor or the like to perform digital control, instead of the transfer functions T(s) and $T^{-1}(s)$, the system will be described by using discretized transfer function T(z) or $T^{-1}(z)$ using a forward operator z. In particular, if the model matching control system is used as described above, implementation with the digital control is practically essential. FIG. 6 is an example where the system illustrated in FIG. 5 is described by the discretized transfer function. The system illustrated in FIG. 6 will be described below.

It is assumed that the position control system 21 of the system illustrated in FIG. 5 is discretized in time period and subject to the model matching control to a second-order model as described below. $a_0$ and $a_1$ are model parameters.

$$T(z) = \frac{1 + a_1 + a_0}{z^2 + a_1 z + a_0} \quad \text{[Math. 1]}$$

The inverse system or the inverse model of this discretized position control system model is as follows.

$$T^{-1}(z) = \frac{z^2 + a_1 z + a_0}{1 + a_1 + a_0} \quad \text{[Math. 2]}$$

However, this is non-proper, and thus, it is an unrealizable function. Therefore, a second-order delay $z^{-2}$ is added to obtain the following equation $$z^{-2} T^{-1}(z) = \frac{z^2 + a_1 z + a_0}{(1 + a_1 + a_0) z^2} \quad \text{[Math. 3]}$$

Now, a realizable inverse model is obtained. However, since the second-order delay $z^{-2}$ is added, to realize more accurate control, the phase of the input signal to the inverse model provided in the compensation loop is to be advanced by two orders and the input signal advanced by two orders is to be estimated. Advancement of the phase by one order can be realized by adding a pseudo differential of the target signal (that is, a difference between signal values in one cycle of the control cycle) to the signal value, and advancement by two orders can be realized by adding two cycles. On the input side of the inverse model, a model of the angular transmission error is arranged, and advancement of the phase of the output signal from the model of the angular transmission error by two orders is equivalent to advancement of the phase of the input signal to the model of the angular transmission error by two orders, but when the output signal from the model of the angular transmission error and the input signal to the model of the angular transmission error are compared in time period change, the time period change of the input signal is more gradual because the input signal is a position signal indicating the shaft angular position x of the motor 2, and thus, the error can be decreased when the input signal to the model of the angular transmission error is subject to pseudo differential. When the delay generated in the inverse modeling is compensated by the phase advance process in the compensation loop, the angular transmission error can be compensated in a state where there is no delay due to the dynamics or the like, and thus, an ideal compensation for the angular transmission error can be performed. Generally, in the digital control of the motor, the shaft angular position of the motor changes sufficiently slowly within a control sampling cycle, and therefore, in the system illustrated in FIG. 6, it is easy to estimate the position advanced by two orders from a difference of the shaft angular position of the motor 2.

Therefore, the system illustrated in FIG. 6 is provided with a position control system 31 constructed by a model matching control system whose transfer function is represented by T(z) and being configured to perform the closed-loop control, and the output signal (shaft angular position of the motor 2) x of the position control system 31 is input to the wave gear reduction mechanism 5. Further, this system includes an inverse model 32 of the position control system 31, a compensation amount generation unit 33 which is a model of the angular transmission error, a subtractor 34 configured to subtract the output of the inverse model 32 from the position command v for the motor 2 and output a subtraction result to the position control system 31, and a forward compensator 35 configured to execute a 2-order phase advance compensation ($z^2$). As described above, the discretized transfer function of the inverse model is represented by $z^{-2} T^{-1}$ (z). The shaft angular position x of the motor 2 is supplied to a forward compensator 35, the output of the forward compensator 35 is supplied to the compensation amount generation unit 33, and the compensation amount generated by the compensation amount generation unit 33 is input to the inverse model 32. The compensation amount generation unit 33 includes a correction table, a function generator, or the like. The compensation amount generation unit 33 to be employed outputs a value obtained by multiplying the angular transmission error by the reduction ratio, in response to the value of the output shaft angular position of the motor 2 which is a digital value.

Next, a method different from the servo control method described by using FIG. 5 will be described for a servo control method according to another embodiment of the present invention. If the position control system 21 is arranged on the left side of the position of the subtractor 24 in the block diagram illustrated in FIG. 5, the position control system 21 is canceled out due to a cancellation of the inverse model compensation by the phase advance compensation in the compensation loop. In this regard, it is possible to obtain a system illustrated in FIG. 7 from the system illustrated in FIG. 4 which is ideal but difficult to be realized. The system illustrated in FIG. 7 can also realize the compensation of the angular transmission error based on at least an embodiment of the present invention.

Figure 7:
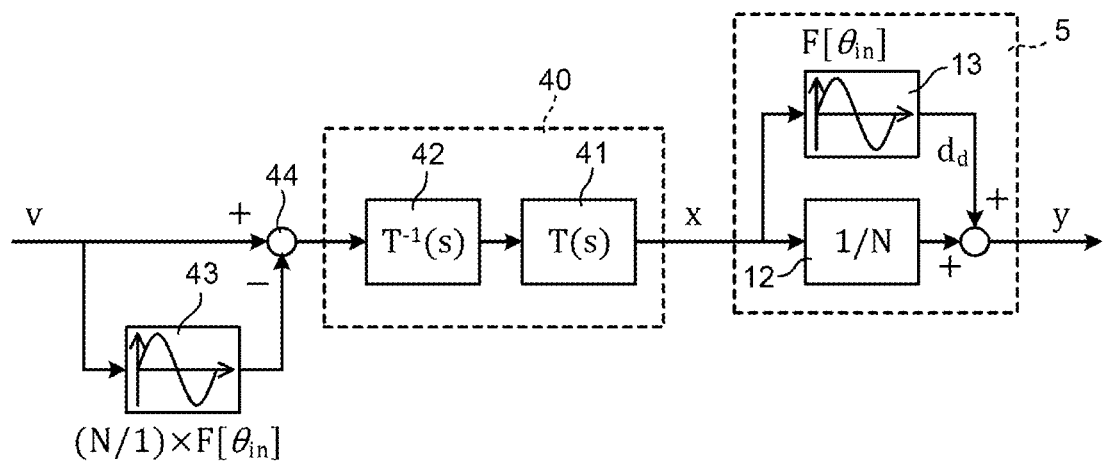
FIG. 7 is a block diagram for explaining a method of compensating for an angular transmission error in a servo control device according to another embodiment.

In the system illustrated in FIG. 7, the position command v for the motor 2 is supplied to a compensation amount generation unit 43 as described above, and in a subtractor 44, the output of the compensation amount generation unit 43 is subtracted from the position command v. Then, a subtraction result of the subtractor 44 is supplied to an inverse system 42, and the output of the inverse system 42 is input to a position control system 41 based on the closed-loop control. The output of the position control system 41 is the shaft angular position x of the motor 2, and is input to the wave gear reduction mechanism 5. The transfer function of the position control system 41 is represented by T(s), and the transfer function of the inverse system 42 is represented by $T^{-1}$(s). A position control block 40 includes the inverse system 42 and the position control system 41.

As can be seen from FIG. 5 and FIG. 7, a minimum configuration for realizing the servo control method based on at least an embodiment of the present invention includes a position control system configured to perform closed-loop control based on a detected shaft angular position x of the motor 2, an inverse control element (inverse system or inverse model) having an inverse characteristic of dynamics of the position control system, and a compensation amount generation unit configured to generate a compensation amount for compensating for an angular transmission error of the wave gear reduction mechanism 5, wherein the compensation amount of the angular transmission error is applied via the inverse control element to the position control system.

Figure 8:
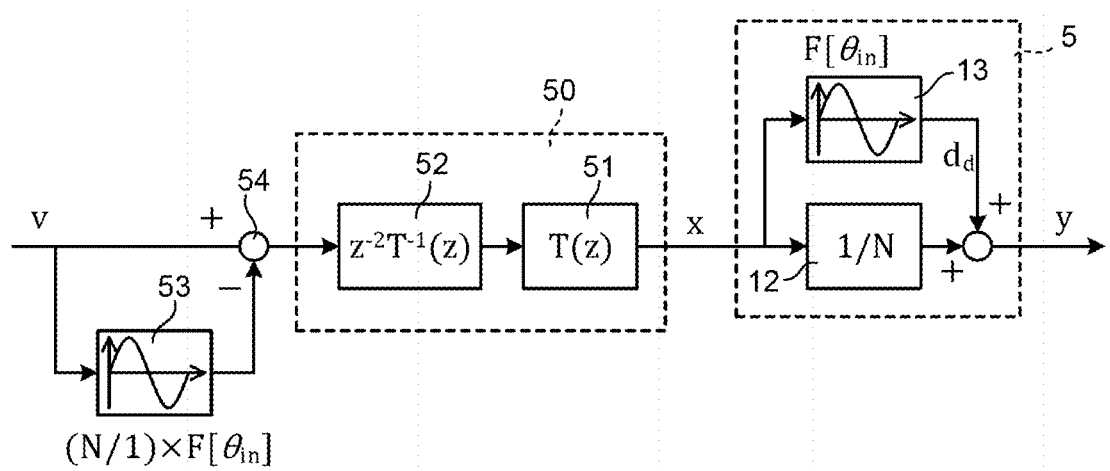
FIG. 8 is a block diagram illustrating an example in which the compensation method illustrated in FIG. 7 is discretized.

FIG. 8 illustrates a system in which the system illustrated in FIG. 7 is modified to a discrete time system for digital control. In the system illustrated in FIG. 8, the position control block 40, the position control system 41, the inverse model 42, the compensation amount generation unit 43, and the subtractor 44 in the system illustrated in FIG. 7 are replaced with a position control block 50, a position control system 51 configured of a model matching control system, an inverse model 52 corresponding to the position control system 51, a compensation amount generation unit 53, and a subtractor 54, respectively. transfer functions of the position control system 41 and the inverse model 42 are represented by T(z) and $z^{-2} T^{-1}$ (z), respectively. The position control system 51, the inverse model 52, and the compensation amount generation unit 53 are similar to the position control system 31, the inverse model 32, and the compensation amount generation unit 33 respectively in the system illustrated in FIG. 6. Also in the system illustrated in FIG. 8, dead beat control of only the group delay is virtually performed on the position control block 50.

Next, model matching control of the position control systems 21, 31, 41, and 51 will be described. If the operation target 4 driven from the motor 2 via the wave gear reduction mechanism 5 is, for example, a joint of a robot, in addition to the angular transmission error, various types of disturbances such as an interference force are added to the joint, and inertia also changes due to a change in posture of the robot. Then, if the position control systems 21, 31, 41, and 51 are regarded as the model matching control system, these systems are constructed by a robust model matching control system having both clear modeling and robustness. Here, the robust model matching control system is a system in which a feedback position servo control system including the motor 2 and the operation target 4 is a model matching control system robust against fluctuations, mismatches, and disturbances. If the robust model matching control system is employed, the robustness against mismatches and disturbances is improved, and the effect of compensating for the angular transmission error is further improved.

Figure 9:
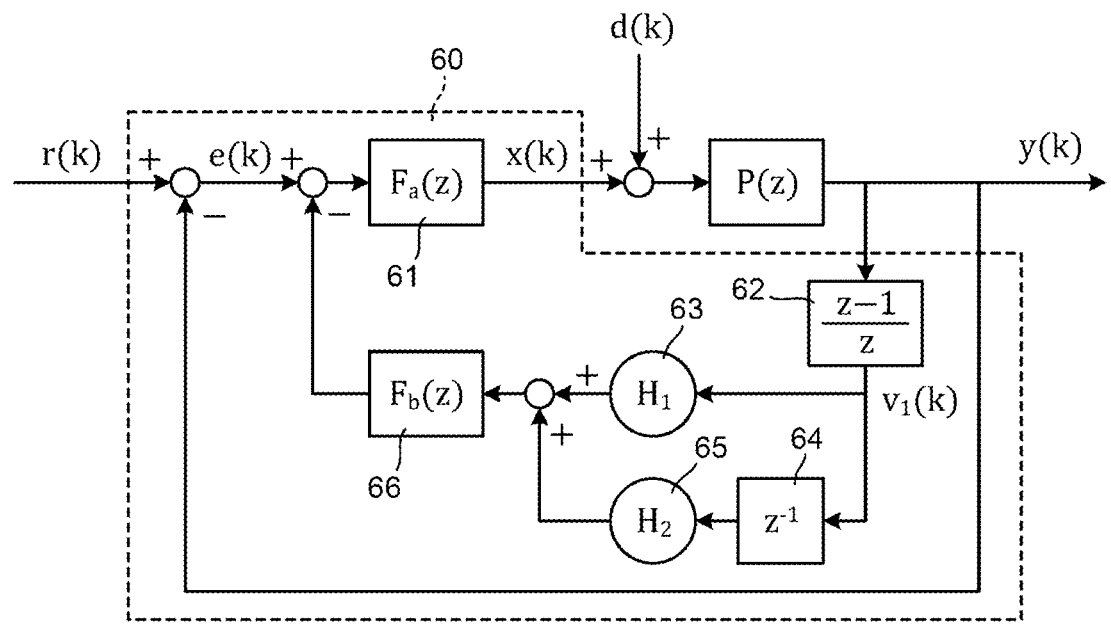
FIG. 9 is a block diagram for explaining robust model matching by a robust pole assignment method by a first-order controller.

Several methods are known as a method of implementing the robust model matching control system. One of the methods is a robust pole assignment method of determining assignment of two poles in closed-loop control to be robust against disturbances in a particular assumed model (Akihiro Ito, et al., "Trend and Some Design Examples of Robust Control in Mechatronic Systems", Journal of the Japan Society for Precision Engineering, Vol. 66, No. 5 (2000), p. 811-815). In the robust pole assignment method, there are a method of using a first-order controller and a method of using a second-order controller as a controller order. FIG. 9 is a block diagram illustrating an example of the robust pole assignment method using a first-order controller. Here, a discrete time system is assumed, and in the following description, $\delta = z-1$. A disturbance d(k) is to be added to the input of the control target. A transfer function P(z) of the control target is modeled by $P(z)=r_0 z/(\delta_2 + p_1 \delta)$. $r_0$ and $p_1$ are model parameters. A control unit 60 includes a PI control unit 61 obtained by modeling PI control, a difference element 62 configured to generate a pseudo velocity $v_1(k)$ by evaluating a difference of an output position y(k) of the control target, a first gain element 63 to which the pseudo velocity $v_1(k)$ is input, a delay element 64 configured to delay the pseudo velocity $v_1(k)$, a second gain element 65 to which an output of the delay element 64 is input, and a low pass filter 66. The low pass filter 66 receives a sum of the output of the first gain element 63 and the output of the second gain element 65. The position y(k) is subtracted from the position command r(k) to generate a position deviation e(k), and a result obtained by subtracting the output of the low pass filter 66 from the position deviation e(k) is input to the PI control unit 61.

A transfer function $F_a(z)$ of the PI control unit 61, a transfer function $H_1$ of the first gain element 63, a transfer function $H_2$ of the second gain element 65, and a transfer function $F_b(z)$ of the low pass filter 66 are represented as follows, respectively:

$$F_a(z)=(\delta+q_0)m_0/(r_0\delta),$$

$$H_1=-(p_1-m_1+m_0-q_0)/(m_0 q_0),$$

$$H_2=\{(m_1-m_0)/m_0\}-H_1,$$

$F_b(z)=q_0 z/(\delta+q_0)$, where $m_0$ and $m_1$ are both model parameters, and the relationship with the above-mentioned model parameters $a_0$ and $a_1$ is $m_0=a_0+a_1+1$, $m_1=a_1+2$. If the disturbance d(k) is zero, the following equations are obtained from the block diagram illustrated in FIG. 9:

$$y(k)=P(z)x(k),$$

$$v_1(k)=(\delta/z)y(k).$$

In addition, $v_1(k)=[m_0/(\delta+p_1)]u(k)$ is obtained.

If the input of the low pass filter 66 is w(k), then $$w(k) = \left(H_1 + \frac{H_2}{z}\right)v_1(k) = \left(\frac{(\delta+1)H_1}{z} + \frac{H_2}{z}\right)\left(\frac{m_0}{\delta+p_1}\right)u(k) \quad \text{[Math. 4]}$$

is established. For u(k) which is the output of the PI control unit 61, $u(k)=F_a(z)\{e(k)-F_b(z)w(k)\}$ is established. As between $F_a(z)$ and $F_b(z)$, there is a relationship of:

$$F_a(z) = \frac{\delta+q_0}{\delta} = \frac{1}{1-\frac{q_0}{\delta+q_0}} = \frac{1}{1-\frac{F_b(z)}{z}} \quad \text{[Math. 5]}$$

the following is obtained.

$$u(k) = \frac{p_1 - m_1 + m_0}{\delta + p_1} u(k) + e(k) \quad \text{[Math. 6]}$$

Further, if this equation is still modified, then finally, the following equation is obtained.

$$y(k) = \frac{m_0 z}{\delta^2 + (m_1 - m_0)\delta + m_0 z}$$
$$r(k) = \frac{m_0 z}{\delta^2 + m_1 \delta + m_0} r(k) \quad \text{[Math. 7]}$$

This equation indicates that in the system illustrated in FIG. 9, a position command response characteristic from the position command r(k) to the position detection y(k) is represented by $(m_0 z)/(\delta_2 + m_1\delta + m_0)$, and although an integrating function (disturbance response) can be adjusted by $q_0$, this adjustment does not affect the position command response characteristic, that is, the robustness and the command response characteristic can be adjusted separately. In other words, regardless of a value of $q_0$ which is a factor indicating integration in the PI control unit 61 and the low pass filter 66, and the position control characteristic can be matched to a characteristic polynomial $\delta_2+m_1\delta+m_0$. While $q_0$ is used as a pole, the pole $q_0$ can be assigned so that the system is robust.

A robust pole assignment method using the second-order controller is described, for example, in Japanese Patents No. 3200496, No. 3850628, and No. 3962215. As an example, in the robust pole assignment method disclosed in Japanese Patent No. 3850628, if the transfer function of the control target is $P(z)=r_0 z/(\delta_2+p_1\delta)$, similarly to above, and a stable characteristic polynomial is $m(\delta)=\delta_2+m_1\delta+m_0$, the following is selected as a stable observer polynomial $q(\delta)$:

$q(\delta)=\delta^n+q_{n-1}\delta^{n-1}+\ldots+q^0$, n=2+d, where d is an assumed disturbance order of a compensation target.

Then, if $$k(\delta)=k_{n-1}\delta^{n-1}+\ldots+k_{d+1}\delta^{d+1}+q_d\delta^d+\ldots+q_0, \text{ and}$$

$$h(\delta)=h_n\delta^n+\ldots+h_0, \text{ then}$$

$$k_j=q_j, j=0 \text{ to } d.$$

$k_i$=d+1 to n−1 and $h_i$, i=0 to n are selected so that $k(\delta)r_0+h(\delta)\{\delta^2+p_1\delta\}=q(\delta)\{p(\delta)-m(\delta)\}$ is satisfied to configure.

a closed-loop control system for applying a control input represented by $x(k)=\{k(\delta)/q(\delta)\}x(k)+\{h(\delta)/q(\delta)\}y(k)+(m_0/r_0)x_1(k)$.

Two poles of the closed-loop control system, that is, roots of the characteristic polynomial $m(\delta)$ are provided with a feedforward compensator represented by $x_1(k)$ for adjusting a ratio of compensation by each $F_1$ and $F_2$. Here, $$x_1(k)=F_2[\{z^{-1}r(k)+F_1(r(k)-z^{-1}r(k))\}-z^{-1}\{z^{-1}r(k)+F_1(r(K)-z^{-1}r(k))\}+z^{-1}\{r(k)-z^{-1}r(k)\}]+z^{-1}[z^{-1}r(k)+F_1\{r(k)-z^{-1}r(k)\}], \text{ where}$$

x(k) is the input signal to the control target, y(k) is the position output signal from the control target, $k(\delta)$ is a numerator polynomial of a filter transfer function $k(\delta)/q(\delta)$ to which the input signal x(k) is input, $h(\delta)$ is a numerator polynomial of a filter transfer function $h(\delta)/q(\delta)$ to which the position output signal y(k) is input, $x_1(k)$ is a position command to the closed-loop control system, and r(k) is a reference position command input to the entire control system. $F_1$ and $F_2$ are feedforward compensation coefficients for a first pole and a second pole of the closed-loop control system, respectively. $p(\delta)$ is a denominator polynomial of a transfer function representing a characteristic of the control target, $r_0$ is a numerator term (coefficient) of the transfer function of the control target, and $p_1$ is a coefficient of a denominator polynomial of the transfer function of the control target. $q(\delta)$ is a stable observer characteristic polynomial incorporated into the controller, and $q_0$ is its zero-order term.

Figure 10:
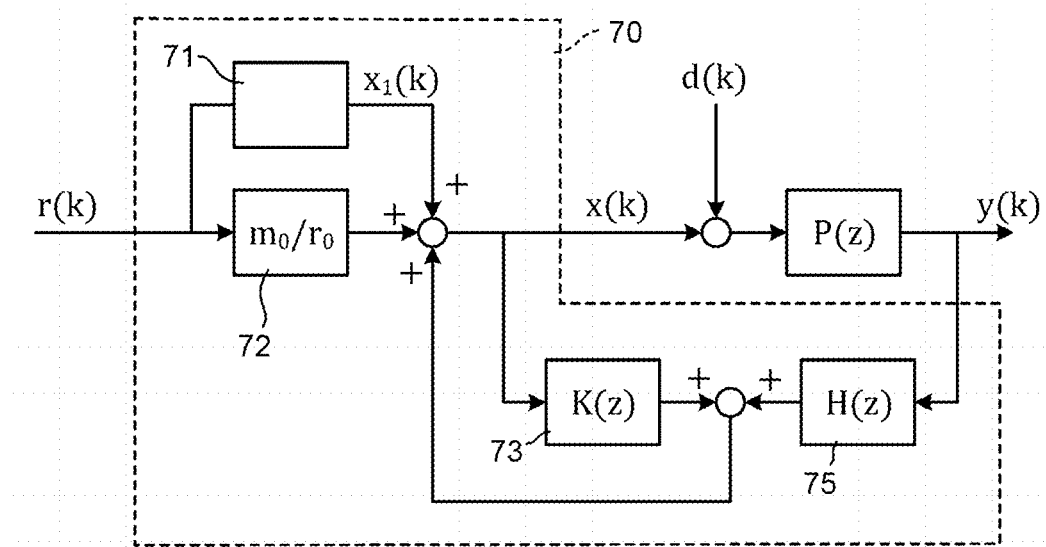
FIG. 10 is a block diagram for explaining robust model matching by a robust pole assignment method by a second-order controller.

FIG. 10 is a block diagram for explaining an example of a robust pole assignment method using the above-described second-order controller. A control unit 70 includes a feedforward compensator 71 configured to receive a reference position command input r(k) and output a feedforward compensation signal $x_1(k)$, and a gain element 72 provided in a portion to which the reference position command input r(k) is input, and two controllers 73 and 75. The controller 73 corresponds to a filter transfer function $k(\delta)/q(\delta)$ to which the input signal x(k) is input, and the transfer function is represented by K(z). The controller 75 corresponds to the filter transfer function $h(\delta)/q(\delta)$ to which the output signal y(k) is input, and the transfer function is represented by H(z). The input signal x(k) to the control target is a result obtained by adding a sum of the output of the controller 73 and the output of the controller 75 to the output of the gain element 72, which is followed by addition of the output $x_1(k)$ of the feedback compensator 71. The controller 73 receives x(k) and the controller 75 receives y(k).

According to the robust pole assignment method using the second-order controller, because of the feedforward compensation, the compensation for the first pole of $m(\delta)$ can be performed with $F_1$ and the compensation for the second pole can be performed with $F_2$ independently. Therefore, this characteristic can be utilized to realize the model matching control robust against mismatches and disturbances.

Although the robust pole assignment methods using the first-order controller or the second-order controller have been described above, the implementation of the robust pole assignment method is not limited to those described above, and there are other implementations. For example, each of the blocks in the above-described configuration can be grouped or separated, and as long as insertion positions of the blocks are equivalent in those in the block diagram illustrated in FIG. 9 or FIG. 10, any implementation may be possible. When the robust pole assignment method is applied to construct the position control system by the robust model matching control system, it is possible to maintain a band characteristic of the setting model up to a predetermined band. Although the band characteristic may not be maintained in a high band, the angular transmission error and disturbance directed by at least an embodiment of the present invention are in a relatively low band, so that a sufficient performance can be obtained by utilizing the robust pole assignment method.

Figure 11:
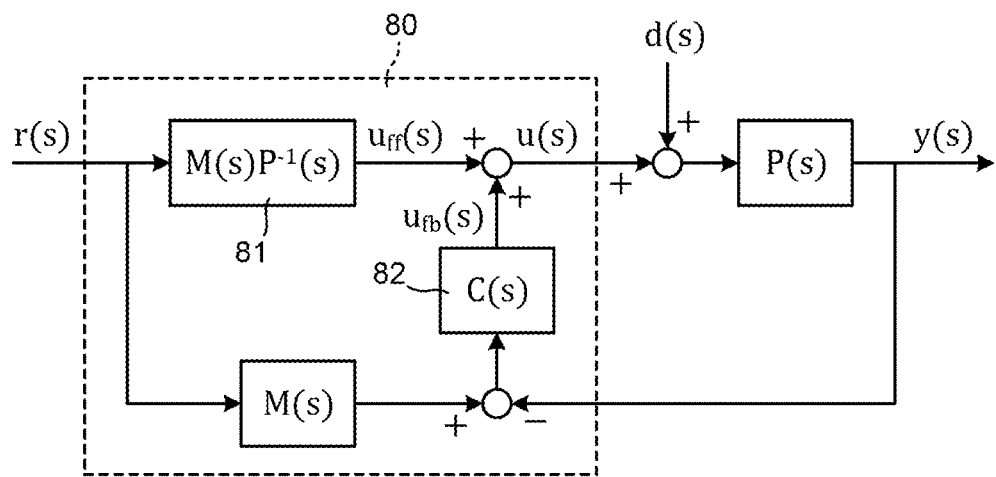
FIG. 11 is a block diagram for explaining a model following control.

An example of a control method other than the robust model matching control includes a model following control. FIG. 11 is a block diagram for explaining an example of the model following control. In the model following control, a model M(s) corresponding to a control target P(s) is constructed, and control is performed so that an output y(s) of the actual control target P(s) follows a result M(s)r(s) obtained by inputting a command r(s) into the model M(s). A control unit 80 of the model following control includes the model M(s), a feedforward controller 81 whose transfer function is represented by $M(s)P^{-1}(s)$, and a feedback controller 82 whose transfer function is represented by C(s). The command r(s) is input to the model M(s) and the feedforward controller 81, and the feedback controller 82 receives a result obtained by subtracting the output y(s) of the control target P(s) from the output of the model M(s). If the outputs of the feedforward controller 81 and the feedback controller 82 are $u_{ff}(s)$ and $u_{fb}(s)$, respectively, the control unit 80 outputs u(s), that is, a sum of $u_{ff}(s)$ and $u_{fb}(s)$, and u(s) is input to the control target P(s). At this time, it is assumed that a disturbance d(s) also is added to the input.

A goal of the model following control is to establish y(s)=M(s)r(s). If there is no disturbance d(s) here, $$u_{ff}(s)=M(s)P^{-1}(s)r(s),$$

$$u_{fb}(s)=C(s)\{M(s)r(s)-y(s)\},$$

$$u(s)=u_{ff}(s)+u_{fb}(s), \text{ and}$$

$$y(s)=P(s)u(s) \text{ are established, and therefore,}$$

$$y(s)=P(s)\{M(s)P^{-1}(s)r(s)+C(s)[M(s)r(s)-y(s)]\} \text{ is obtained.}$$

Since y(s)=M(s)r(s) is obtained from the above equation, it is understood that the control target P(s) follows the model M(s) in the system illustrated in FIG. 11. Further, if r(s)=0, and the disturbance d(s) is added, then, $$y(s)=P(s)d(s)-P(s)C(s)y(s) \text{ is established.}$$

From the above equation, $$y(s)=[P(s)/\{1+P(s)C(s)\}]d(s) \text{ is obtained.}$$

From the above equation, if the characteristic polynomial of $P(s)/\{1+P(s)C(s)\}$ is stable and the numerator component includes a denominator component of the disturbance d(s), the influence of the disturbance d(s) is converged on 0. That is, in the model following control illustrated in FIG. 11, when the model of the disturbance d(s) is included in the transfer function C(s) of the feedback controller 82, the robustness can be imparted to the disturbance d(s).

Further, in at least an embodiment of the present invention, as a method other than the robust model matching control for constructing the position control system, it is possible to use a method in which the P-PI control constructed to be robust against mismatches and disturbances is performed to grasp a whole of the system, a method in which a disturbance observer compensation control constructed to be robust against mismatches and disturbances (for example, see Kouhei Onishi, "Robust Motion Control by Disturbance Observer", Journal of the Robotics Society of Japan, Vol. 11, No. 4 (1993), p. 486-493) is performed to grasp a whole of the system, and the like. It is possible to construct an inverse model of the position control system as long as the position control system can be correctly modeled by either the P-PI control or the disturbance observer compensation control.

In the servo control device according to the embodiment described above, with a simple configuration where if the position control system of detecting the shaft angular position of the motor and performing the closed-loop control based on the shaft angular position is provided, an inverse control element, that is, an inverse system or an inverse model, having an inverse characteristic of dynamics of the position control system, and a compensation amount generating unit including, for example, a correction table, the compensation amount generation unit being configured to generate the compensation amount by which the angular transmission error of the wave gear reduction mechanism is compensated are provided, and the compensation amount of the angular transmission error is applied via the inverse control element to the position control system, the angular transmission error of the wave gear device can be effectively compensated with high accuracy.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit," "element," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the laser scanner, partly on the laser scanner, as a stand-alone software package, partly on the laser scanner and partly a connected computer, partly on the laser scanner and partly on a remote computer or entirely on the remote computer or server. In the latter scenario, the remote computer may be connected to the laser scanner through any type of network, including a local area network (LAN) or a wide area network (WAN), or the connection may be made to an external laser scanner (for example, through the Internet using an Internet Service Provider).

Aspects of the present disclosure are described with reference to block diagrams of methods, apparatus (systems) and computer program products according to embodiments of the disclosure. It will be understood that each block of the block diagrams, and combinations of blocks in block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The block diagrams in FIGS. 1-11 illustrate the architecture, functionality, and operation of possible implementations of systems, methods, and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and, and combinations of blocks in the block diagrams, may be implemented by special purpose hardware-based systems that perform the specified functions or acts, or combinations of special purpose hardware and computer instructions.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A servo control device for controlling a motor based on a position command when an operation target is connected to the motor via a wave gear reduction mechanism, comprising:
    a position control system configured to detect a shaft angular position of the motor to perform a closed-loop control based on the shaft angular position;
    an inverse control element having an inverse characteristic of dynamics of the position control system; and
    a compensation amount generation unit configured to generate a compensation amount for compensating for an angular transmission error of the wave gear reduction mechanism, wherein
    the inverse control element is configured to apply compensation amount to the position control system.

2. The servo control device according to claim 1, further comprising: a compensation loop configured to feed the shaft angular position back to the position control system, outside the position control system, wherein
    the compensation loop comprises the compensation amount generation unit and the inverse control element.

3. The servo control device according to claim 2, wherein the position control system is configured by a discrete time system, the inverse control element comprises a delay element, and a forward compensation unit configured to perform a forward compensation is provided on an input side of the inverse control element in the compensation loop.

4. The servo control device according to claim 3, wherein the forward compensation unit is configured to perform the forward compensation by estimating the shaft angular position at a time advanced by a delay time period, based on a control cyclic difference value of a signal of a current shaft angular position.

5. The servo control device according to claim 1, wherein the position control system is configured by a discrete time system, and the inverse control element comprises a delay element.

6. The servo control device according to claim 1, wherein the position control system is configured to execute a closed-loop control based on a model matching control.

7. The servo control device according to claim 6, wherein the position control system is configured to execute the model matching control based on a robust pole assignment in which two poles in the closed-loop control are assigned to be robust against disturbances.

8. The servo control device according to claim 1, wherein the position control system is configured to execute a control based on a model following control in which a model corresponding to a control target is constructed, and a control is performed so that an actual output of the control target follows a result obtained by inputting a command into the model.

9. The servo control device according to claim 1, wherein the position control system is configured to execute a closed-loop control based on a P-PI control.

10. The servo control device according to claim 1, wherein the position control system is configured to execute a closed-loop control based on a disturbance observer compensation control.

11. The servo control device according to claim 1, wherein the compensation amount generation unit comprises a correction table in which a relationship between a shaft angular position of the motor and the angular transmission error is previously measured and accumulated, and is configured to generate the compensation amount based on the correction table.

12. The servo control device according to claim 1, wherein the compensation amount generation unit is configured to approximate a first-order frequency component of the angular transmission error with a sine function by previously measuring a relationship between a shaft angular position of the motor and the angular transmission error, and generate the compensation amount based on the sine function.

13. A robot driven by the servo control device according to claim 1.

14. A servo control method of controlling a motor based on a position command when an operation target is connected to the motor via a wave gear reduction mechanism, comprising:
    detecting a shaft angular position of the motor to execute a closed-loop control, based on the shaft angular position in a position control system;
    generating a compensation amount for compensating for an angular transmission error of the wave gear reduction mechanism;
    effecting an inverse characteristic of dynamics of the position control system on the compensation amount; and
    applying the compensation amount on which the inverse characteristic is effected, to the position control system.

15. The servo control method according to claim 14, wherein in a compensation loop provided outside the position control system, the compensation loop being configured to feed the shaft angular position back to the position control system, the generating a compensation amount and the effecting an inverse characteristic are executed.

16. The servo control method according to claim 15, wherein the closed-loop control is executed in a discrete time system, a delay element is added to the inverse characteristic, and performing a forward compensation is performed before the s effecting the inverse characteristic in the compensation loop.

17. The servo control method according to claim 16, wherein the performing a forward compensation comprises estimating the shaft angular position at a time advanced by a delay time period, based on a control cyclic difference value of a signal of a current shaft angular position.

18. The servo control method according to claim 14, wherein the closed-loop control is executed in a discrete time system, and a delay element is added to the inverse characteristic.

19. The servo control method according to claim 14, wherein the generating a compensation amount comprises generating the compensation amount with reference to a correction table in which a relationship between the shaft angular position of the motor and the angular transmission error is previously measured and accumulated.

20. The servo control method according to claim 14, wherein the generating a compensation amount comprises generating the compensation amount by a sine function for approximating a first-order frequency component of the angular transmission error obtained by previously measuring a relationship between the shaft angular position of the motor and the angular transmission error.

* * * * *